J. W. MILLER.
EQUALIZER FOR VEHICLE SPRINGS.
APPLICATION FILED OCT. 16, 1915.

1,201,604.

Patented Oct. 17, 1916.

Witnesses

Inventor
John W. Miller
By John A. Bommhardt
Attorney

UNITED STATES PATENT OFFICE.

JOHN W. MILLER, OF CLEVELAND, OHIO.

EQUALIZER FOR VEHICLE-SPRINGS.

1,201,604.   Specification of Letters Patent.   Patented Oct. 17, 1916.

Application filed October 16, 1915.   Serial No. 56,257.

*To all whom it may concern:*

Be it known that I, JOHN W. MILLER, citizen of the United States, residing at Cleveland, in the county of Cuyahoga and State of Ohio, have invented certain new and useful Improvements in Equalizers for Vehicle-Springs, of which the following is a specification.

This invention relates to equalizers for vehicle springs, and it is especially adapted for use on Ford cars, although capable of use in other relations.

The object of the invention is to form an improved device which will absorb shocks and which will relieve excessive strain or movement in either direction, the device embodying a system of links and levers connected to the main spring and operating in conjunction with an auxiliary spring forming part of the device.

Figure 1:
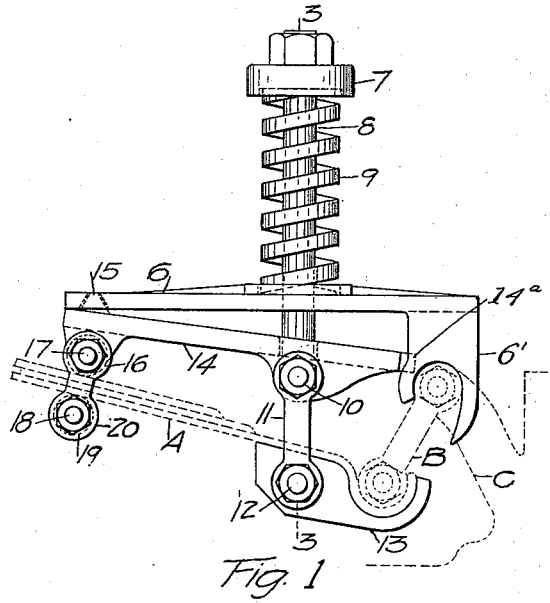
Figure 2:
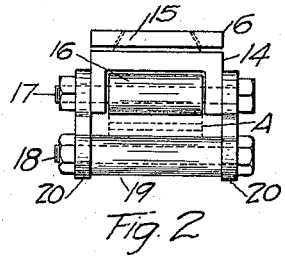
Figure 3:
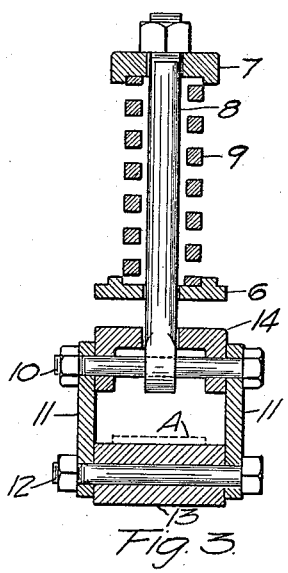
Figure 4:
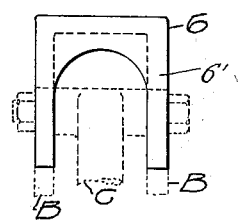

In the accompanying drawings—Figure 1 is a side elevation of the device. Fig. 2 is an end view thereof. Fig. 3 is a section of the line 3—3 of Fig. 1. Fig. 4 is an end view of the upper plate.

Referring specifically to the drawings, A indicates the main or ordinary spring, and B the links or shackles connecting the same to the bracket C.

6 is an upper plate which has at one end a forked extension or depending part 6′ which hooks over the upper pivot of the links B, the branches of the fork embracing or extending on opposite sides of the bracket C. An auxiliary spring 9 rests upon this plate, being coiled around a pin 8 between said bracket and a cap 7 held by a nut screwed on the top of the pin. The lower end of this pin is connected to a bolt 10 which extends through depending ears on the lower plate 14. This plate has at one end a lug 15 which projects into an opening in the plate 6, forming a bearing therewith, and at the opposite end the plate 14 has a projection 14ª which fits in and is guided between opposite branches of the fork 6′. The bolt 10 also connects the upper ends of links 11 and the plate 14, the lower ends of said links being connected by the bolt 12 to the saddle piece 13 which is shaped to engage under the lower leaf of the spring A at the end thereof, fitting partly around the knuckle where it connects to the links B. The inner end of the plate 14 is connected by links 20 and a bolt 17 to a lower bolt 18, and these bolts 17 and 18 are provided with rollers 16 and 19. The end of the spring A projects between the rollers 16 and 19 and has a bearing against the same, and the extremity of the spring is also confined between the links 11.

In effect, the plates 6 and 14 form levers through which the motion of the main spring A is transmitted to the auxiliary spring 9, plate 6 having its fulcrum on the bracket C, and the plate 14 having its fulcrum at the lug 15. When the shock is downward the pull of the pin 8, which is transmitted from the spring A through the links 11 and the bolt 10, compresses the spring 9, the plate 6 vibrating on its fulcrum at the outer end, and the inner end of the plate causing the roller 16 to bear down on top of the main spring A. On the rebound the plate 14 yields upwardly, and is lifted by the spring 9, and by a sort of lever action communicated through the links 20 causes the lower roller 19 to bear against the under side of the spring A. These actions have the effect of relieving shocks and also preventing excessive action or rebound of the parts. The rollers 16 and 19 permit the longitudinal movement of the spring A therebetween, incident to the elongation of said spring, which action is also permitted by the links 11 which, with the saddle 13, form the connecting means between the device and the knuckle of the spring. The spring 9 absorbs all minor vibrations. When the rebound is considerable, the lower plate 14 will lift and stop against the upper plate 6, and by the binding action of the rollers 16 and 19 the vibrations of the main spring A will be dampened or checked. The device will therefore take care of both upward and downward vibrations and will ease off excessive movement in either direction, thereby adding to the riding qualities of relatively stiff springs.

What I claim is:

1. The combination with a main spring and its bracket, of an upper lever on said bracket, a lower lever fulcrumed on the other end of the upper lever, a sliding connection between the lower lever and the main spring, an auxiliary spring resting upon the upper lever, and suspending connections between said auxiliary spring and the lower lever and main spring.

2. The combination with a main leaf spring and a supporting bracket to which it is connected, of a lever fulcrumed at one end on the bracket and having a sliding connection at the other end with the main spring at a distance from the end of said spring, an auxiliary spring resting on the lever, and flexible suspending connections between the auxiliary spring and the main spring.

3. The combination with a main leaf spring, of an auxiliary spring connected to the end of the leaf spring, a lever on which said auxiliary spring presses, and means actuated by said lever to bind against the main spring at a distance from the end thereof, to check or dampen the action thereof, when said lever is vibrated.

4. The combination of a main leaf spring, an auxiliary spring supporting the outer end thereof, a lever against which said auxiliary spring presses, and binding means having variable gripping engagement with the main spring and operatively connected to said lever and actuated by the vibration thereof to apply pressure on said main spring at a distance from its end, and thereby dampen its vibrations.

5. The combination with a main leaf spring and a bracket to which its end is connected, of an upper lever fulcrumed on the bracket, a lower lever fulcrumed on the upper lever, means connected to the lower lever and embracing the main spring at a distance from its end and constructed to bear against said spring when the levers are vibrated, an auxiliary spring bearing upon the upper lever, a suspending connection between said auxiliary spring and the lower lever, and a flexible connection between the lower lever and the end of the leaf spring.

6. The combination of a main leaf spring, an auxiliary spring from which the outer end of the leaf spring is suspended, a lever against which the auxiliary spring presses, a second lever fulcrumed on said lever and connected to the auxiliary spring, and a linked structure embracing the leaf spring at a distance from its end and connected to said second lever, and having bearing parts arranged to bear against said leaf spring when the levers are vibrated.

7. The combination with a main leaf spring and its supporting bracket, of an upper lever fulcrumed on said bracket and extending above the leaf spring, a lower lever fulcrumed on the upper lever and located between the same and the spring, bearing means connected to the lower lever and embracing the leaf spring and adapted to press against the same, a coil spring mounted on the upper lever, a suspending rod connecting the coil spring and the lower lever, and a connection between the lower lever and the end of the leaf spring.

In testimony whereof, I do affix my signature in presence of two witnesses.

JOHN W. MILLER.

Witnesses:
J. B. DANS,
JOHN A. BOMMHARDT.